(12) United States Patent
Huang et al.

(10) Patent No.: US 12,167,392 B2
(45) Date of Patent: Dec. 10, 2024

(54) NACK BASED FEEDBACK FOR SEMI-PERSISTENT SCHEDULING TRANSMISSIONS

(71) Applicant: QUALCOMM Incorporated, San Diego, CA (US)

(72) Inventors: Yi Huang, San Diego, CA (US); Hwan Joon Kwon, San Diego, CA (US); Peter Gaal, San Diego, CA (US); Ahmed Elshafie, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/471,071

(22) Filed: Sep. 9, 2021

(65) Prior Publication Data

US 2022/0095341 A1    Mar. 24, 2022

Related U.S. Application Data

(60) Provisional application No. 63/081,302, filed on Sep. 21, 2020.

(51) Int. Cl.
*H04W 72/12* (2023.01)
*H04L 1/18* (2023.01)
*H04L 1/1812* (2023.01)
*H04L 1/1867* (2023.01)
(Continued)

(52) U.S. Cl.
CPC ....... *H04W 72/1273* (2013.01); *H04L 1/1819* (2013.01); *H04L 1/1896* (2013.01);
(Continued)

(58) Field of Classification Search
CPC ............ H04W 72/1273; H04W 72/23; H04W 52/365; H04L 1/1819; H04L 1/1896;
(Continued)

(56) References Cited

U.S. PATENT DOCUMENTS 11,071,127 B2 * 7/2021 Dudda ................ H04L 5/0055
2015/0230237 A1 * 8/2015 Clevorn ................. H04L 1/20
455/452.2

(Continued)

FOREIGN PATENT DOCUMENTS

WO    2015179212 A1    11/2015
WO    2019165176 A1    8/2019

OTHER PUBLICATIONS

International Search Report and Written Opinion—PCT/US2021/049943—ISA/EPO—Dec. 21, 2021.

*Primary Examiner* — Hoang-Chuong Q Vu
(74) *Attorney, Agent, or Firm* — Procopio, Cory, Hargreaves & Savitch LLP

(57) ABSTRACT

A user equipment (UE) determines an occurrence of a triggering event for providing negative acknowledgment (NACK) based feedback for a semi-persistent scheduling (SPS) transmission. The apparatus monitors for the SPS transmission. The apparatus transmits a NACK if the SPS transmission is not successfully received and refrains from sending an ACK if the SPS transmission is successfully received based on the occurrence of the triggering event for providing NACK based feedback. The base station determines an occurrence of a triggering event for a UE to provide NACK based feedback for an SPS transmission. The apparatus transmits the SPS transmission and determines that the UE successfully received the SPS transmission based on an absence of a NACK from the UE for the SPS transmission.

15 Claims, 12 Drawing Sheets

(51) Int. Cl.
*H04L 5/00* (2006.01)
*H04W 72/1273* (2023.01)
*H04W 72/23* (2023.01)
*H04W 52/36* (2009.01)

(52) U.S. Cl.
CPC ........... *H04L 5/0055* (2013.01); *H04W 72/23* (2023.01); *H04W 52/365* (2013.01)

(58) Field of Classification Search
CPC ... H04L 5/0055; H04L 1/1671; H04L 1/1854; H04L 1/1829; H04L 1/1848; H04L 1/1887
See application file for complete search history.

(56) References Cited

U.S. PATENT DOCUMENTS

| | | | |
|---|---|---|---|
| 2018/0167171 A1* | 6/2018 | Wu | H04L 1/1816 |
| 2019/0222967 A1* | 7/2019 | Ratilainen | H04L 1/1887 |
| 2020/0177348 A1* | 6/2020 | Agarwal | H04L 1/1854 |
| 2021/0218512 A1* | 7/2021 | Xu | H04L 1/1893 |
| 2021/0243782 A1* | 8/2021 | Miao | H04L 5/0091 |
| 2021/0250905 A1* | 8/2021 | Liu | H04L 5/0055 |
| 2022/0015109 A1* | 1/2022 | Fong | H04W 76/11 |
| 2022/0086602 A1* | 3/2022 | Ashraf | H04W 4/44 |
| 2022/0095351 A1* | 3/2022 | Baldemair | H04W 72/23 |
| 2022/0174646 A1* | 6/2022 | Lee | H04L 5/0044 |
| 2022/0183010 A1* | 6/2022 | Murakami | G01S 13/74 |
| 2022/0337347 A1* | 10/2022 | Yu | G08G 1/094 |
| 2023/0093477 A1* | 3/2023 | El Hamss | H04L 1/1861 |
| 2023/0133238 A1* | 5/2023 | Fu | H04L 1/1896 370/329 |
| 2023/0180269 A1* | 6/2023 | Li | H04W 72/30 370/312 |
| 2023/0216565 A1* | 7/2023 | Kwak | H04B 7/0695 375/267 |
| 2023/0224109 A1* | 7/2023 | Sokun | H04L 1/1819 370/329 |

\* cited by examiner

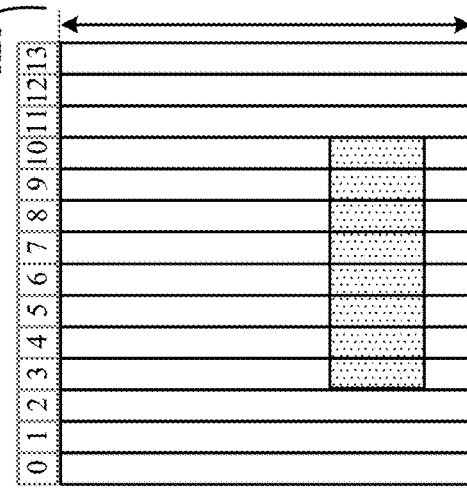
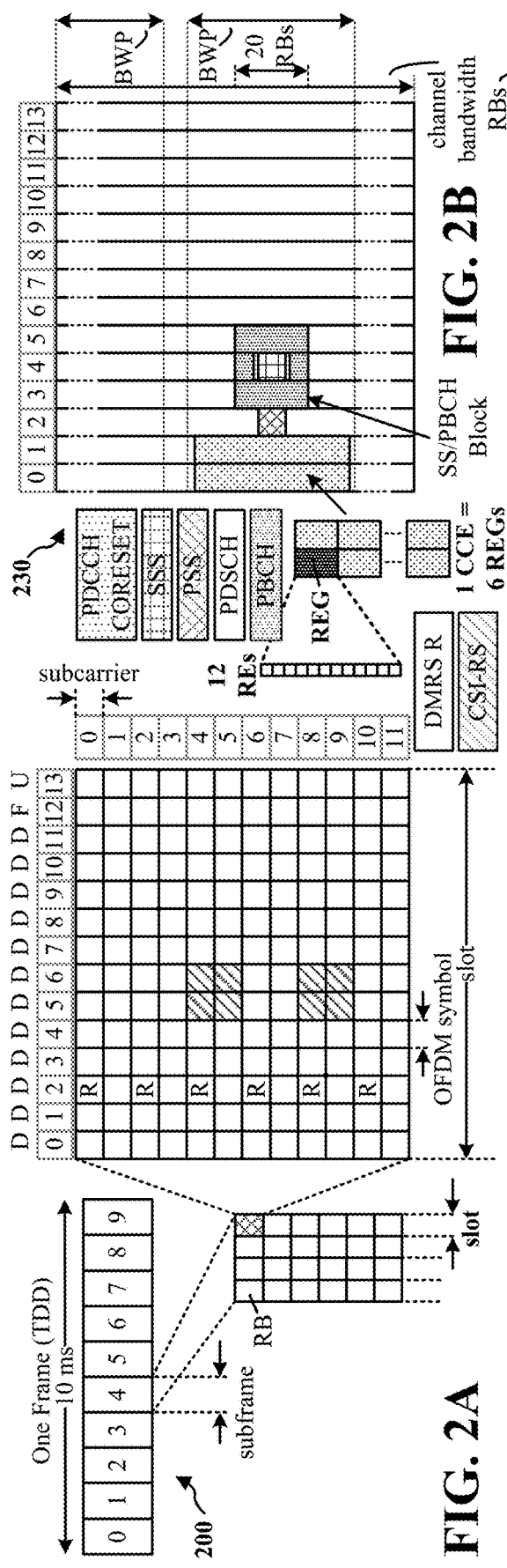
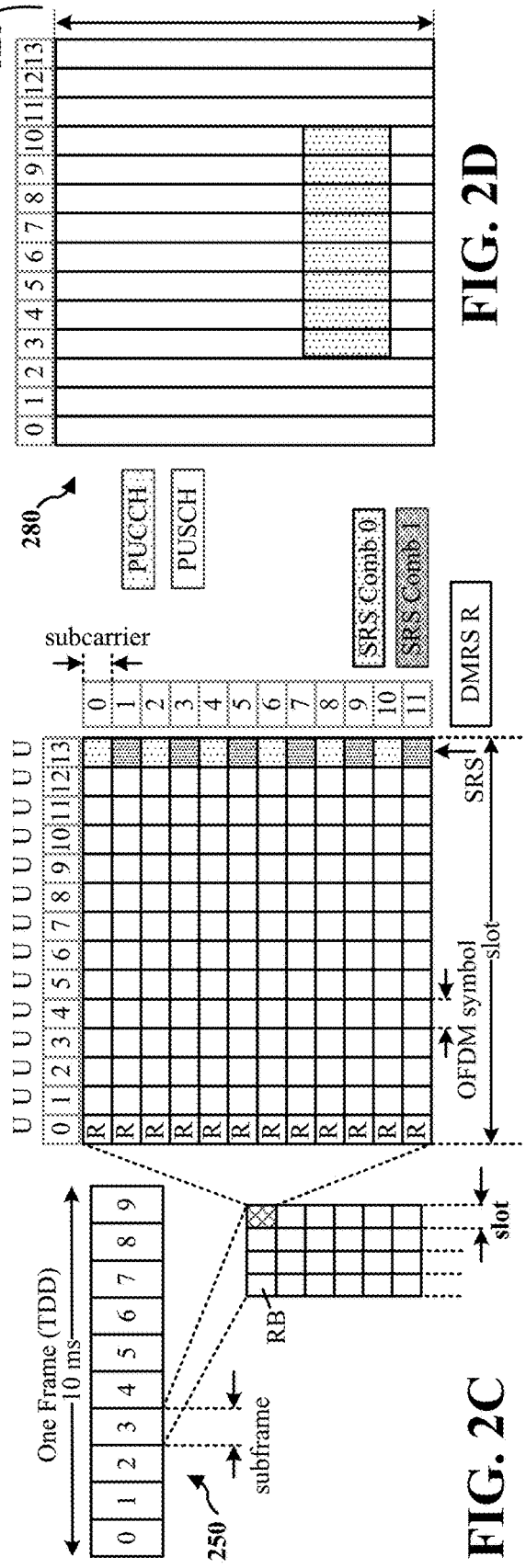
FIG. 2A  FIG. 2B  FIG. 2C  FIG. 2D

NACK BASED FEEDBACK FOR SEMI-PERSISTENT SCHEDULING TRANSMISSIONS

CROSS REFERENCE TO RELATED APPLICATION(S)

This application claims the benefit of and priority to U.S. Provisional Application Ser. No. 63/081,302, entitled "NACK Based Feedback for Semi-Persistently Scheduling Transmissions" and filed on Sep. 21, 2020, which is expressly incorporated by reference herein in its entirety.

TECHNICAL FIELD

The present disclosure relates generally to communication systems, and more particularly, to wireless communication based on semi-persistent scheduling (SPS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some wireless communication is based on semi-persistent scheduling (SPS) having a configuration that provides periodic transmission occasions. Aspects presented herein provide for more efficient communication based on SPS.

In an aspect of the disclosure, a method, a computer-readable medium, and an apparatus are provided for wireless communication. The aspects may be performed by a user equipment (UE) in some examples. The apparatus determines an occurrence of a triggering event for providing negative acknowledgment (NACK) based feedback for a semi-persistent scheduling (SPS) transmission. The apparatus monitors for the SPS transmission. The apparatus transmits a NACK if the SPS transmission is not successfully received and refrains from sending an ACK if the SPS transmission is successfully received based on the occurrence of the triggering event for providing NACK based feedback.

In another aspect of the disclosure, a method, a computer-readable medium, and an apparatus are provided for wireless communication. The aspects may be performed by a base station in some examples. The apparatus determining an occurrence of a triggering event for a UE to provide NACK based feedback for an SPS transmission. The apparatus transmits the SPS transmission and determines that the UE successfully received the SPS transmission based on an absence of a NACK from the UE for the SPS transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
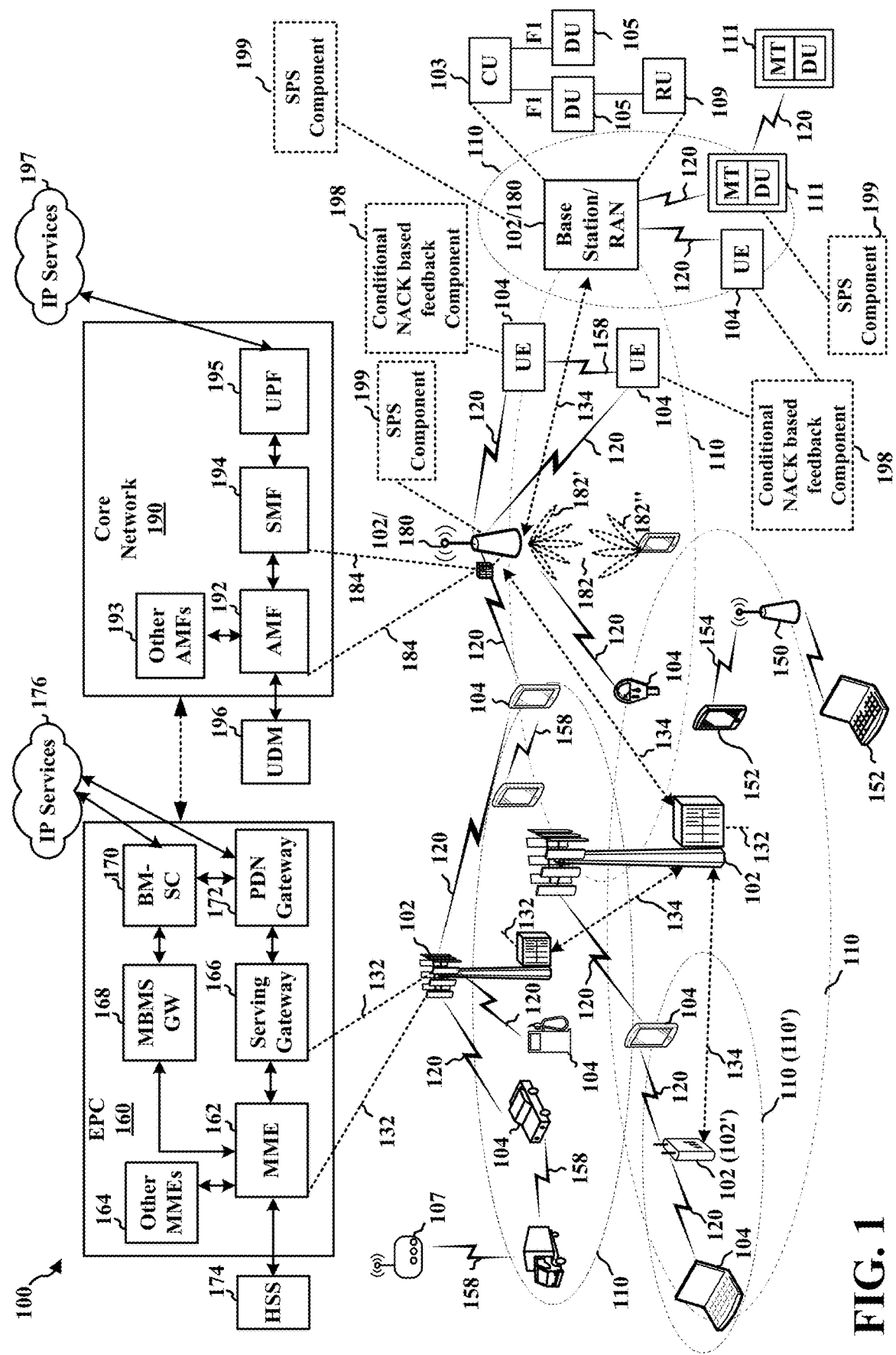
FIG. 1 is a diagram illustrating an example of a wireless communications system and an access network, in accordance with aspects of the present disclosure.

Some wireless communication may be based on semi-persistent scheduling (SPS) that provides periodic transmission occasions. For example, a base station may send data (e.g., a physical downlink shared channel (PDSCH) transmission) in the periodic transmission occasions without individual downlink control information (DCI) scheduling each of the PDSCH transmissions. Instead, the SPS resources may be allocated, or configured, e.g., for an SPS service, and a first DCI may activate an SPS service. A UE may monitor the SPS transmission occasions to attempt to receive the PDSCH transmissions from the base station. After each transmission occasion, the UE may send feedback, e.g., hybrid automatic repeat request (HARQ)-ACK feedback, providing an acknowledgment (ACK) or negative acknowledgement (NACK) informing the base station whether the PDSCH transmission was successfully received by the UE. A physical uplink control channel (PUCCH) grant may be associated with each SPS transmission occasion, and the UE may transmit the ACK/NACK for the SPS transmission occasion in the corresponding PUCCH resources.

A base station may apply link adaptation, power control, and/or rate adaptation in order to target a particular success rate for the SPS transmission. The success rate may be different for different types of communication. For example, the target success rate of SPS PDSCH for eMBB communication may be 90%, and the target success rate of SPS PDSCH for URLLC may be 99.999%.

In some examples, the UE may reduce the amount of uplink transmissions by providing NACK based HARQ feedback in which the UE only transmits the HARQ feedback if the HARQ feedback is a NACK. If the UE successfully receives the SPS PDSCH, the UE may skip sending the ACK. If there is a problem with the uplink channel between the UE and the base station, the base station may miss receiving a NACK from the UE and may assume that the UE has successfully received the SPS PDSCH.

Aspects presented herein provide for a reduction of uplink signaling by the UE while balancing the potential for a base station to miss reception of a NACK through a conditional application of NACK based feedback for SPS transmissions. As an example, the UE may apply NACK based feedback based on good uplink channel conditions. As another example, the UE may apply NACK based feedback for retransmissions, as a retransmission indicates that the base station received the NACK that triggered the retransmission. As another example, the UE may apply NACK based feedback based on an indicator of uplink channel quality, such as a threshold amount of power headroom at the UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspect described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspect may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

A base station 102 or 180 may transmit SPS transmissions (e.g., PDSCH) to one or more UEs 104. The UE 104 may monitor for the SPS transmissions and may provide feedback to the base station 102 or 180 indicating whether the UE 104 successfully received the SPS transmission. The base station may adjust future SPS transmissions based on the feedback from the UE 104. As described herein, a UE 104 may include a conditional NACK based feedback component 198 that is configured to transmit a NACK if an SPS transmission is not successfully received and based on an occurrence of a triggering event for providing NACK based feedback for a SPS transmission. The conditional NACK based feedback component 198 may be further configured to skip transmission of an ACK if the SPS transmission is successfully received and based on the occurrence of the triggering event for providing NACK based feedback. A base station 102 or 180 that transmits an SPS transmission to one or more UEs 104 may include an SPS component 199 that is configured to monitor for NACK based feedback based on an occurrence of a triggering event for a UE 104 to provide NACK based feedback for an SPS transmission. As example, when the base station 102 or 180 transmits an SPS transmission and does not receive a NACK from the UE, the SPS component 199 may be configured to determine that the UE 104 successfully received the SPS transmission based on an absence of a NACK from the UE 104 for the SPS transmission.

Although aspects of the following description may be focused on 5GNR, the concepts described herein may be applicable to other similar areas, such as LTE, LTE-A, CDMA, GSM, and other wireless technologies.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 103, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB (e.g., the base station 180) may operate in a traditional sub 6 GHz spectrum, in millimeter wave frequencies, and/or near millimeter wave frequencies in communication with the UE 104. When the gNB (e.g., the base station 180) operates in millimeter wave or near millimeter wave frequencies, the gNB (e.g., the base station 180) may be referred to as a millimeter wave base station. The millimeter wave base station (e.g., the base station 180) may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
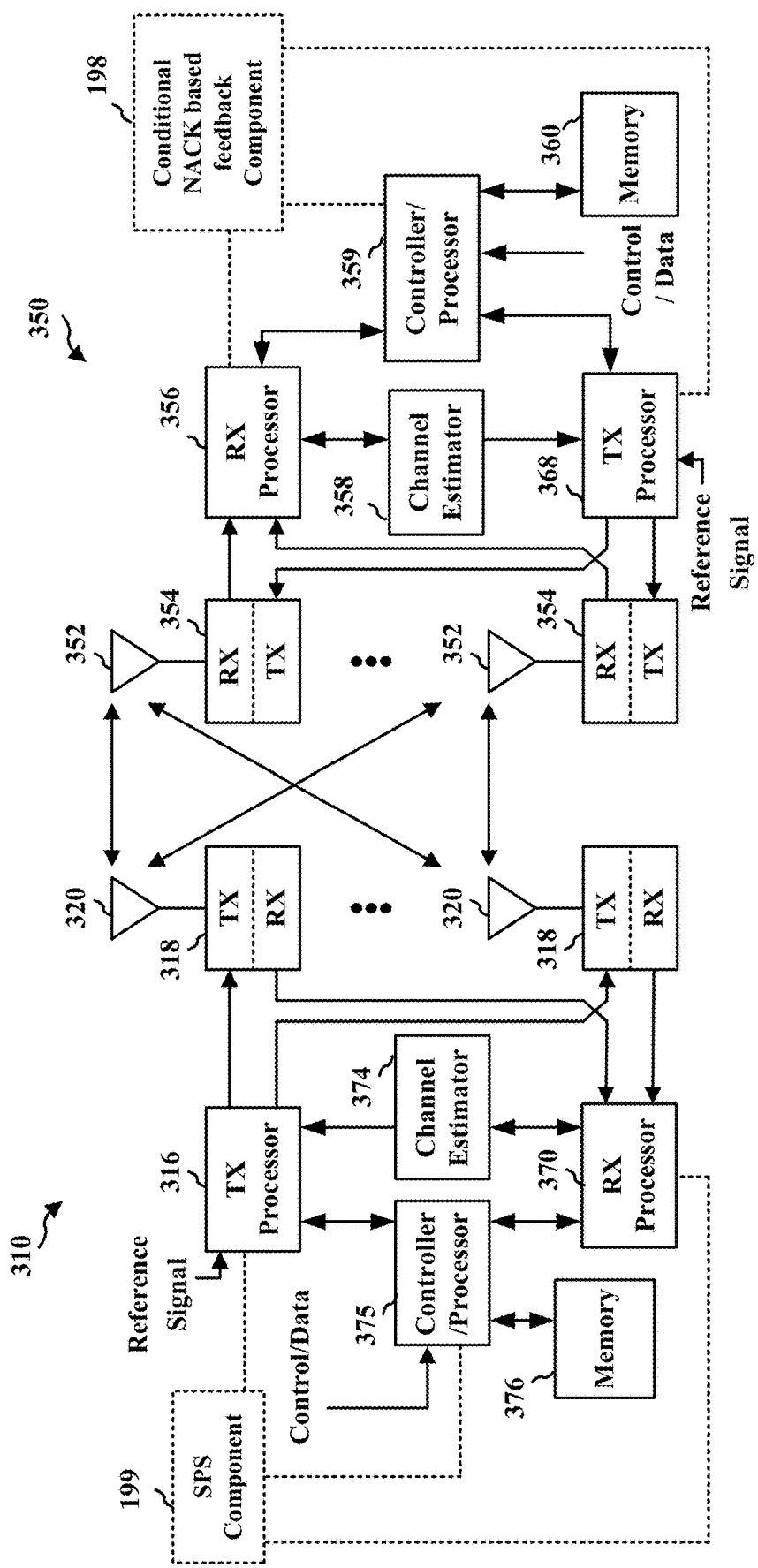
FIG. 3 is a diagram illustrating an example of a base station and user equipment (UE) in an access network, in accordance with aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the conditional NACK based feedback component 198 of FIG. 1.

At least one of the TX processor 316, the RX processor 370, and the controller/processor 375 may be configured to perform aspects in connection with the SPS component 199 of FIG. 1.

Figure 4:
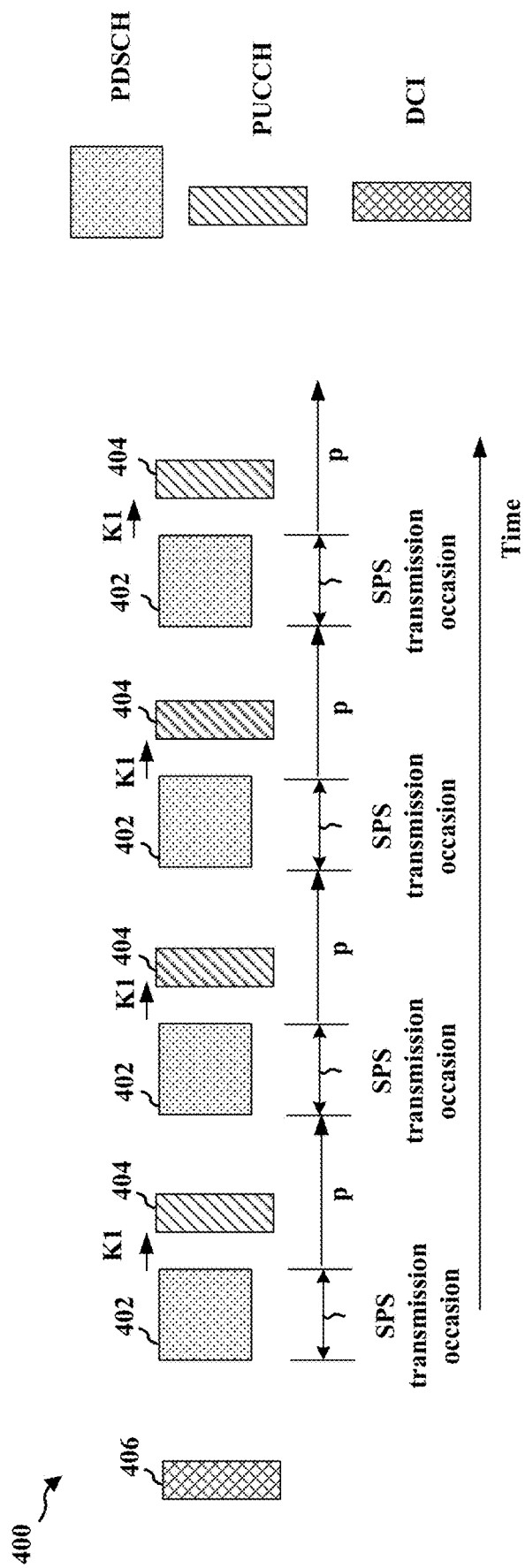
FIG. 4 illustrates an example of SPS transmissions based on an SPS configuration, in accordance with aspects of the present disclosure.

Some wireless communication is based on an allocation of period resources, such as semi-persistent scheduling (SPS), that provides periodic transmission occasions that can be used for transmissions without DCI scheduling each transmission occasion. FIG. 4 illustrates an example of periodic SPS transmission occasions 400 that are separated by a period of time p. For example, a base station may send data (e.g., a PDSCH transmission) in the periodic transmission occasions. The PDSCH transmissions may be transmitted without individual DCI scheduling each of the transmissions. Instead, a set of periodic resources may be allocated or configured for the UE, and a first DCI may activate an SPS service, e.g., as illustrated in FIG. 4. The SPS service may be based on an SPS configuration that provides parameters for the SPS transmission occasions, the period between the SPS transmission occasions, among other example parameters. The base station may provide the SPS configuration in radio resource control (RRC) signaling to the UE, and may activate the SPS configuration with a DCI 406 transmitted to the UE.

Once the configured and activated, the UE may monitor the SPS transmission occasions to attempt to receive the SPS PDSCH transmissions 402 from the base station. After each transmission occasion, the UE may send feedback 404, e.g., HARQ-ACK feedback, providing an ACK or NACK, informing the base station whether the PDSCH transmission was successfully received by the UE. A PUCCH grant may be associated with each SPS transmission occasion, and the UE may transmit the ACK/NACK for the SPS transmission occasion in the corresponding PUCCH resources. The PUCCH resources may occur a period of time K1 following the SPS transmission. The parameter K1 may be provided in the SPS configuration. K1 may be indicated in slots, for example.

A base station may apply link adaptation, power control, and/or rate adaptation in order to target a particular success rate for the SPS transmission. The success rate may be different for different types of communication. For example, the target success rate of SPS PDSCH for eMBB communication may be 90%, and the target success rate of SPS PDSCH for URLLC may be 99.999%. Meeting the target success rate will lead the UE to provide ACK feedback for 90% of the SPS transmissions or for 99.999% of the SPS transmissions. Thus, many of the HARQ-ACK transmissions from the UE may be to provide an ACK.

In some examples, the UE may reduce the amount of uplink transmissions by providing NACK based HARQ feedback in which the UE only transmits the HARQ feedback if the HARQ feedback is a NACK. The NACK based HARQ feedback may be referred to as NACK only feedback, e.g., as the UE may provide NACK feedback and may skip sending ACK feedback for successful PDSCH reception. For example, if the UE successfully receives the SPS PDSCH, the UE may skip sending the ACK to the base station in NACK based feedback. The base station may assume that the UE has successfully received the SPS transmission if the base station does not receive a NACK from the UE. In this type of feedback, the base station does not interpret the absence of a NACK to indicate that the UE was unsuccessful in receiving the PDSCH. As a large percentage of the SPS transmissions may be successful, the NACK based feedback may reduce the amount of transmissions by avoiding multiple ACK transmissions. The NACK based feedback may provide power savings for the UE and may reduce interference to other devices.

However, if there is a problem with the uplink channel between the UE and the base station, the base station may miss a NACK transmitted by the UE and may assume that the UE has successfully received the SPS PDSCH. The base station may proceed to transmit other SPS transmissions without providing a retransmission of the missed SPS transmission. The UE may continue to be unsuccessful in receiving the further SPS transmissions. For example, the base station may not receive the NACK due to deep fading for the channel between the UE and the base station, interference, a hand or other object blocking the transmission antenna at the UE (e.g., in FR2), etc. As the base station continues to interpret the absence of the NACK to mean that the UE successfully received the SPS transmissions and may not become aware of the unsuccessful reception at the UE.

Aspects presented herein provide for a reduction of uplink signaling by the UE while also balancing the potential for a base station to miss reception of a NACK through a conditional application of NACK based feedback for SPS transmissions. As an example, the UE may apply NACK based feedback based circumstances that indicate a good uplink channel condition and/or that indicates that the base station is likely to receive a NACK from the UE. As one example, the UE may apply NACK based feedback for retransmissions, because a retransmission indicates that the base station received the NACK from the UE that triggered the retransmission. As another example, the UE may apply NACK based feedback based on an indicator of uplink channel quality, such as a threshold amount of power headroom at the UE.

Figure 5:
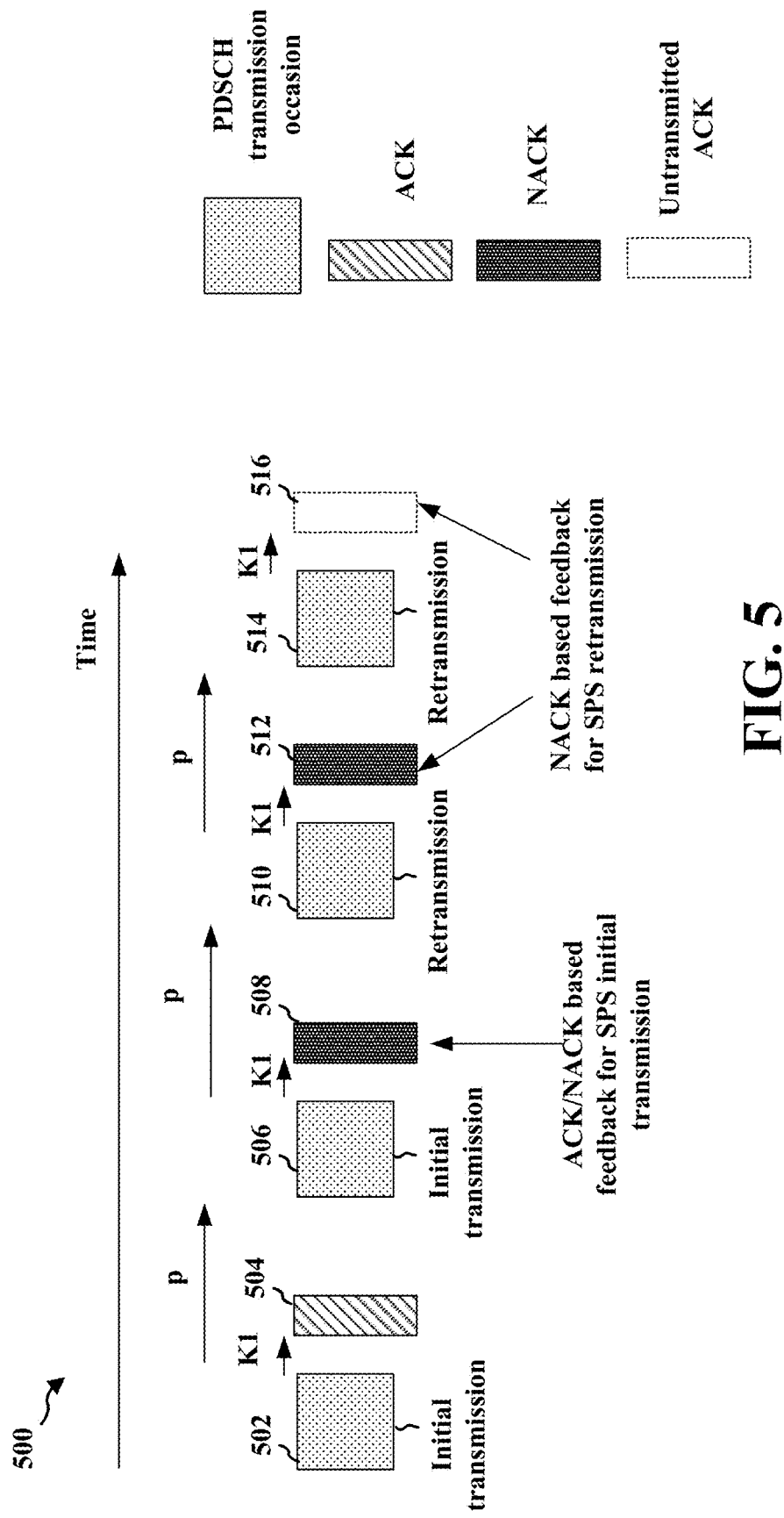
FIG. 5 illustrates an example of SPS transmissions having conditional NACK based feedback, in accordance with aspects of the present disclosure.

FIG. 5 illustrates an example of SPS transmissions 500 in which a UE applies ACK/NACK feedback for initial transmissions of SPS PDSCH. The UE transmits an ACK 504 to the base station if the SPS PDSCH (e.g., 502) is successfully received and transmits a NACK (e.g., 508) to the base station if the SPS PDSCH (e.g., 506) is not successfully received. The determination of whether the SPS PDSCH is successfully received may be based on whether decoding of the SPS PDSCH passes a check at the UE. In response to the UE's NACK, the base station transmits one or more retransmissions of the SPS PDSCH (e.g., 510, 514).

The UE may determine to send NACK based feedback for the retransmission. For example, the reception of an SPS retransmission 510 may be a trigger event that triggers the UE to apply the NACK based feedback for the SPS retransmission. An SPS retransmission may be scheduled by a DCI scrambled by a configured scheduling radio network temporary identifier (CS_RNTI). The DCI may have a new data indicator NDI field that indicates that the SPS retransmission is a retransmission rather than an initial transmission. For example, an NDI=1 may indicate to the UE that the SPS is retransmission. If the UE successfully decodes the retransmission (e.g., 514), the UE does not provide an ACK (e.g., 516), e.g., skips sending the HARQ feedback. If the UE does not successfully decode the SPS retransmission (e.g., 510), the UE transmits a NACK (e.g., 512) to the base station.

The retransmission may trigger the UE to provide NACK based feedback because the NACK provided by the UE was received by the base station, as indicated by the retransmission. Thus, the retransmission may indicate that the uplink channel quality is acceptable, e.g., meets a quality threshold.

Thus, a retransmission may be a metric that the UE uses to determine that an uplink channel quality meets a condition to provide NACK based feedback.

If the UE receives another initial SPS transmission, the UE may return to providing ACK/NACK based feedback. In other examples, the UE may stop providing the NACK based feedback, and may return to providing ACK/NACK feedback based on a timer.

Figure 12:
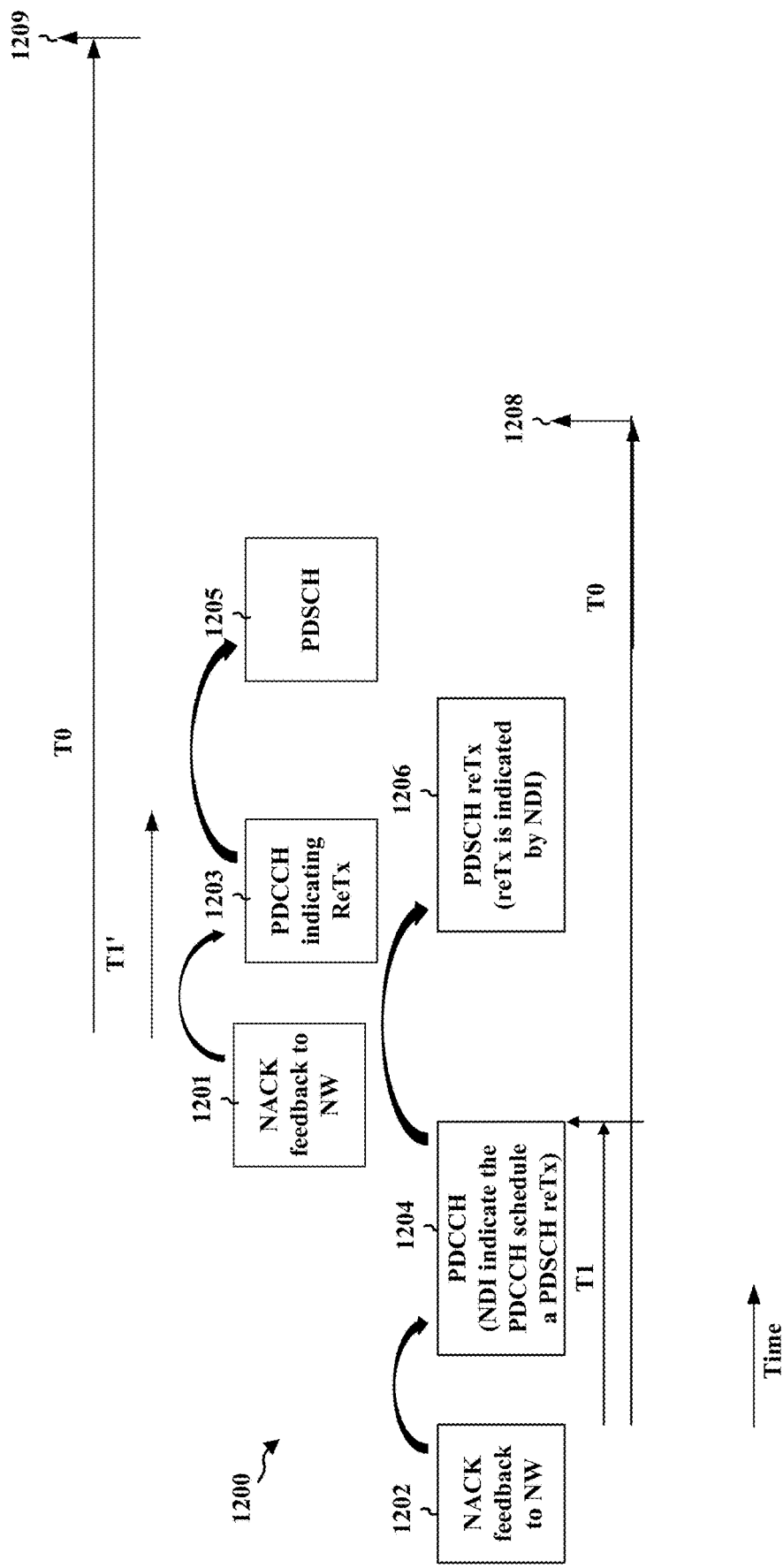
FIG. 12 illustrates an example time diagram for stopping application of NACK based feedback, in accordance with aspects of the present disclosure.

FIG. 12 illustrates an example time diagram 1200 showing the disabling/turning off the NACK based feedback based on one or more timers. The timer may enable the UE to stop NACK based feedback and to return to sending ACK/NACK based feedback, e.g., in an automatic manner, after a period of time. Due to channel variation over time, the uplink channel quality may change and may become worse over time. In order to ensure quality communication between the UE and the base station, the UE may turn off the NACK based feedback after a period of time. The period of time may be based on one or more times configured by the base station, e.g., in RRC signaling. The period of time may be based on an uplink channel coherent time estimation in some examples.

In FIG. 12, after reception of the PDCCH 1204 with a new data indicator (NDI) field value that indicates the scheduled PDSCH is a retransmission, the UE knows that a retransmission is scheduled by the network. The UE may turn on the NACK-only feedback feature/functionality, and may start a timer with value T0-T1. T0 may be a constant value configured by the network, e.g., via RRC. T1 may be the time from the previous NACK feedback 1202 to the corresponding DCI (e.g., PDCCH 1204) schedule the retransmission 1206 in response to the NACK. The timer used by the UE may be based on T0-T1 because T0 may be the time configured by network, e.g., assuming that a NACK was received on the uplink channel T0 time before, then a NACK is likely to be received by the network for at least the amount of time T0. T0 may be smaller than the uplink channel coherent time, which means that the uplink channel does not change much within T0. The amount of time T1 may be subtracted from T0 in order to determine the timer applied by the UE because T1 has already passed in time from the time that the UE sent the NACK until the PDCCH is received (e.g., which provides the condition triggering the UE to send the NACK based feedback). The remaining timer value of T0-T1, may be applied by the UE following the trigger event (e.g., the PDCCH 1204 indicating the retransmission) while staying within the amount of time (T0 from the NACK feedback 1202) that the uplink channel is likely to be robust enough to deliver a NACK successfully to the network. Thus, the UE may provide the NACK based feedback from the time that the UE determines the occurrence of the trigger event (e.g., receiving the indication of the retransmission in PDCCH 1204) for an amount of time T0-T1 and may return to providing ACK/NACK feedback at point in time 1208. After the timer (e.g., based on T0-T1) expires, the UE may turn the NACK only feedback feature off.

If another DCI indication 1203 of a retransmission of PDSCH 1205 is received (e.g., in response to NACK 1201) before the timer expires (e.g., before time 1208), the UE may reset the timer with a value T0-T1' in which T1' is based on a procedure similar to T1. Thus, T0 may end at 1209. The value of T1' may be different than T1 because the base station may send a PDCCH to schedule a retransmission at different times.

Figure 6:
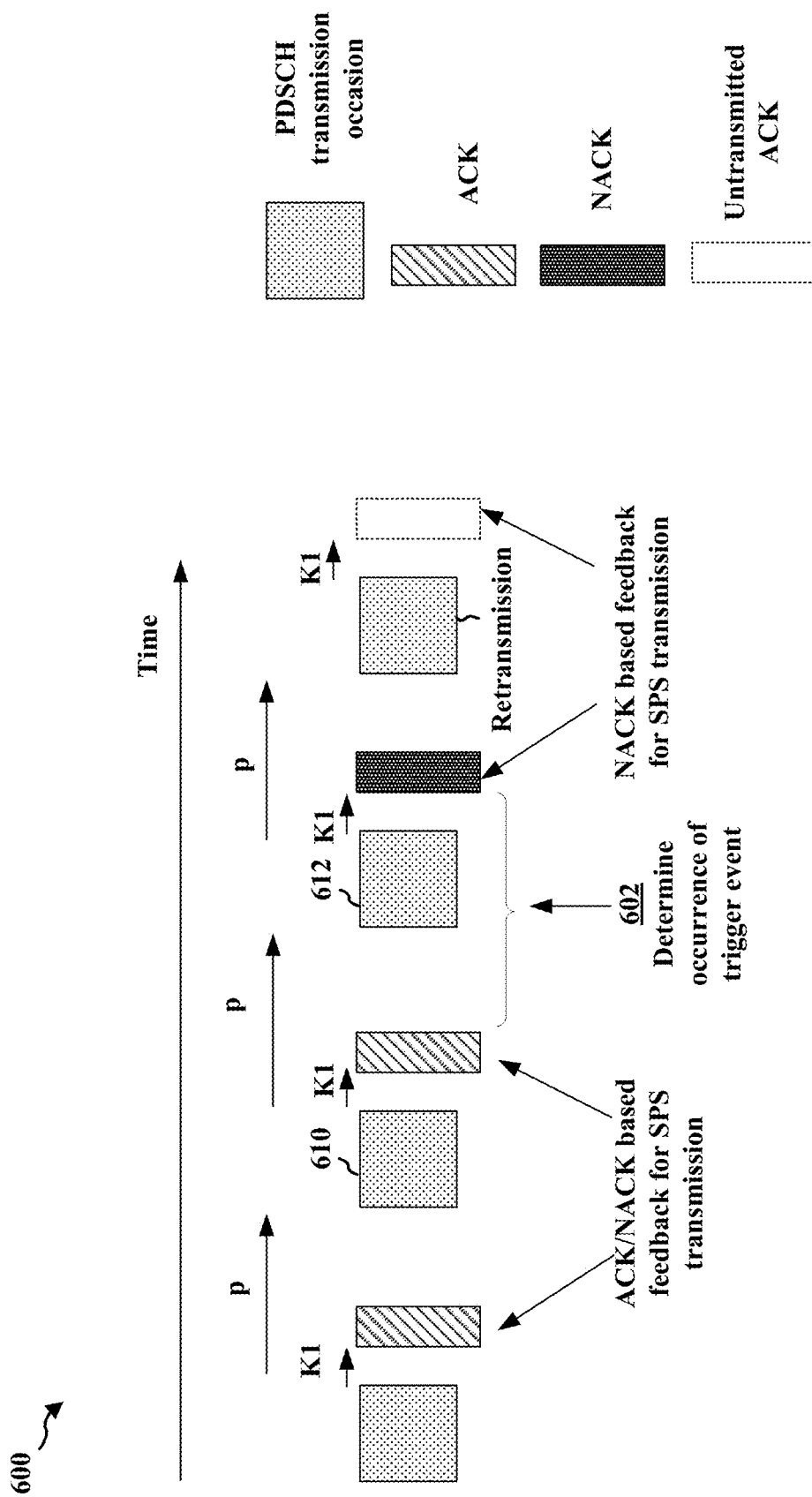
FIG. 6 illustrates an example of SPS transmissions having conditional NACK based feedback, in accordance with aspects of the present disclosure.

FIG. 6 illustrates an example of SPS transmissions 600 in which a UE applies ACK/NACK based feedback or NACK based feedback for transmissions of SPS PDSCH based on a metric or indication of an uplink channel quality. The metric may be based on an uplink channel quality or a parameter that indicates an uplink channel quality, such as the amount of power headroom for the UE.

If the channel quality metric does not meet a threshold, e.g., is below a threshold quality level or the UE does not have a threshold amount of power headroom for uplink transmissions, the UE provides ACK/NACK based feedback for the SPS transmissions. For example, the UE transmits an ACK to the base station if the SPS PDSCH is successfully received and transmits a NACK to the base station if the SPS PDSCH is not successfully received.

In response to the UE's NACK, the base station transmits a retransmission of the SPS PDSCH.

Between SPS PDSCH transmission 610 and sending feedback for the SPS PDSCH transmission 612 (e.g., within the period of time 602), the UE may determine to send NACK based feedback. For example, during the period of time 602, the UE may determine the occurrence of an event that triggers the NACK based feedback. For example, the UE may determine that the channel quality metric meets a threshold, e.g., is above a threshold quality level or the UE has a threshold amount of power headroom for uplink transmissions. When applying the NACK based feedback mechanism, if the UE successfully decodes the retransmission, the UE does not provide an ACK, e.g., skips sending the HARQ feedback. If the UE does not successfully decode the SPS retransmission, the UE transmits a NACK to the base station.

Although not illustrated in FIG. 6, the UE may later determine that the uplink channel quality does not meet a level to provide the NACK based feedback and may return to providing the ACK/NACK based feedback. In other examples, the UE may stop NACK based feedback and may return to providing ACK/NACK feedback based on a timer, such as described in connection with FIG. 12. The timer may be based on a time at which the UE determines the trigger event has occurred to provide the NACK based feedback.

Figure 7:
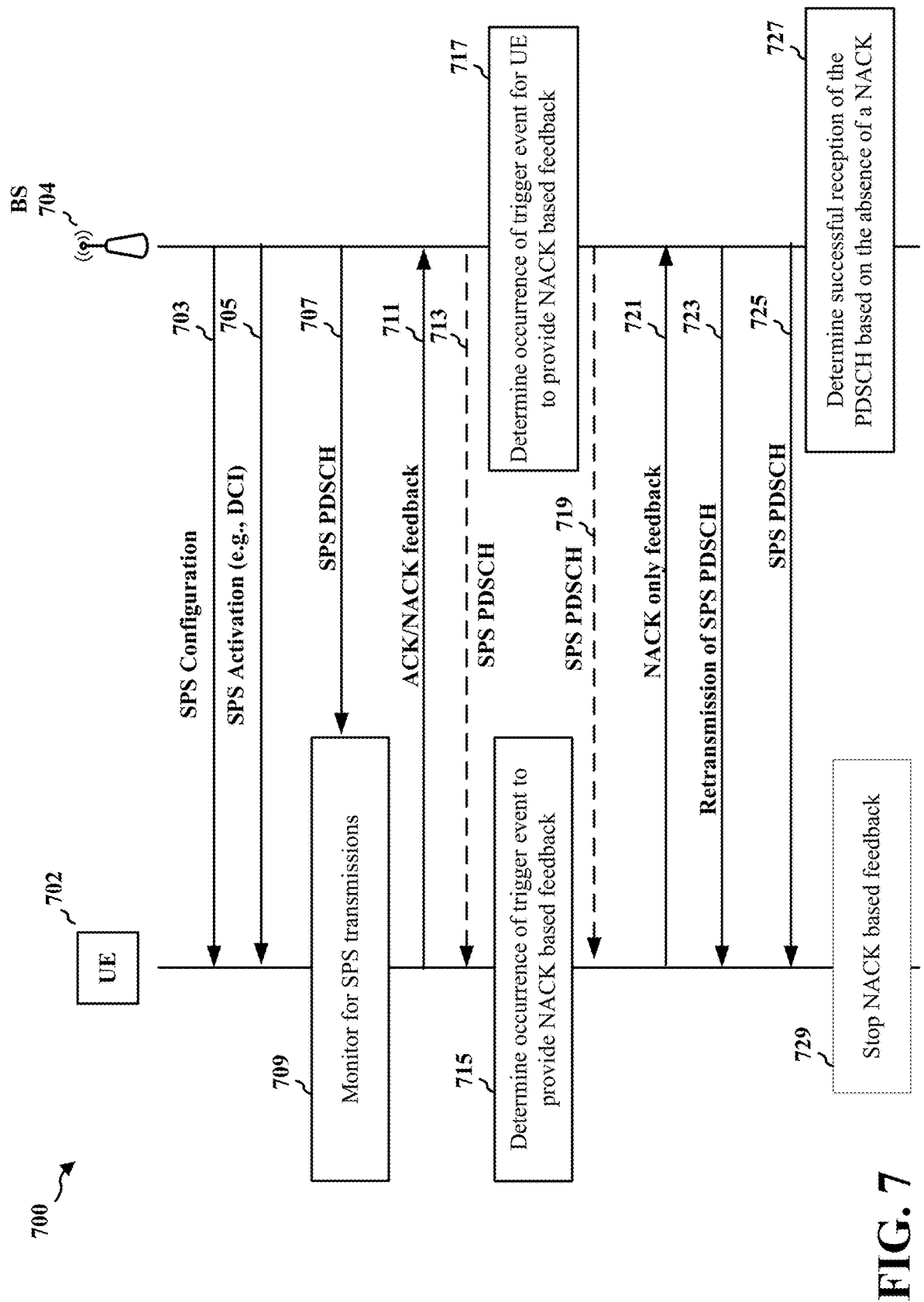
FIG. 7 illustrates an example communication flow including conditional NACK based feedback, in accordance with aspects of the present disclosure.

FIG. 7 illustrates an example communication flow 700 between a UE 702 and a base station 704 that includes condition NACK based feedback for SPS transmissions. Although the example in FIG. 7 is described for the example of a base station and a UE, the concept presented in connection with the example in FIG. 7 may be applied for any transmitter transmitting SPS transmissions and a receiving the SPS transmissions. The base station 704 may provide an SPS configuration 703 to the UE 702 with a periodicity (e.g., p) for SPS transmissions from the base station 704 and a time parameter (e.g., K1) for PUCCH resources for the UE to provide HARQ-ACK feedback for the SPS transmissions. The base station may transmit an activation 705 of the SPS configuration, e.g., in DCI. Based on the activation of the SPS configuration, the base station may transmit periodic PDSCH transmissions to the UE 702 during SPS transmission occasions, e.g., as described in connection with any of FIGS. 4-6. The UE 702 may monitor for the SPS transmissions, at 709. The UE may provide ACK/NACK feedback 711 for an SPS PDSCH 707, e.g., as described in connection with FIG. 4.

At 715, the UE determines an occurrence of a trigger to provide NACK based feedback (or NACK only feedback) in contrast to the ACK/NACK feedback 711. The trigger may be a retransmission of PDSCH or a metric that indicates an uplink channel quality, such as described in connection with FIG. 4 or FIG. 5. The UE 702 monitors for SPS PDSCH transmissions (e.g., 713 or 719) and provides NACK based feedback 721 for the PDSCH. As illustrated in FIG. 7, the determination at 715 may occur prior to receiving the PDSCH 719 or may after receiving the PDSCH 713. For example, the PDSCH 713 may be a retransmission, which may trigger the UE 702 to provide NACK based feedback, at 721.

In order to determine whether the UE received the SPS PDSCH transmission 713 or 719, the base station may similarly determine an occurrence of the trigger event that leads the UE to provide the NACK based feedback, at 717. If the base station receives a NACK at 721, the base station may transmit a retransmission 723 of the SPS PDSCH. If the base station does not receive a NACK for the SPS PDSCH 725, the base station determines, at 727, that the UE successfully received the SPS PDSCH 725.

At 729, the UE may stop the NACK based feedback. The UE may stop providing NACK based feedback based on a timer, e.g., as described in connection with FIG. 12. The UE may stop the NACK based feedback based on determining an occurrence of a second trigger event that causes the UE to provide ACK/NACK feedback. The second trigger event may be the expiration of the timer in some examples.

Figures 8A, 8B:
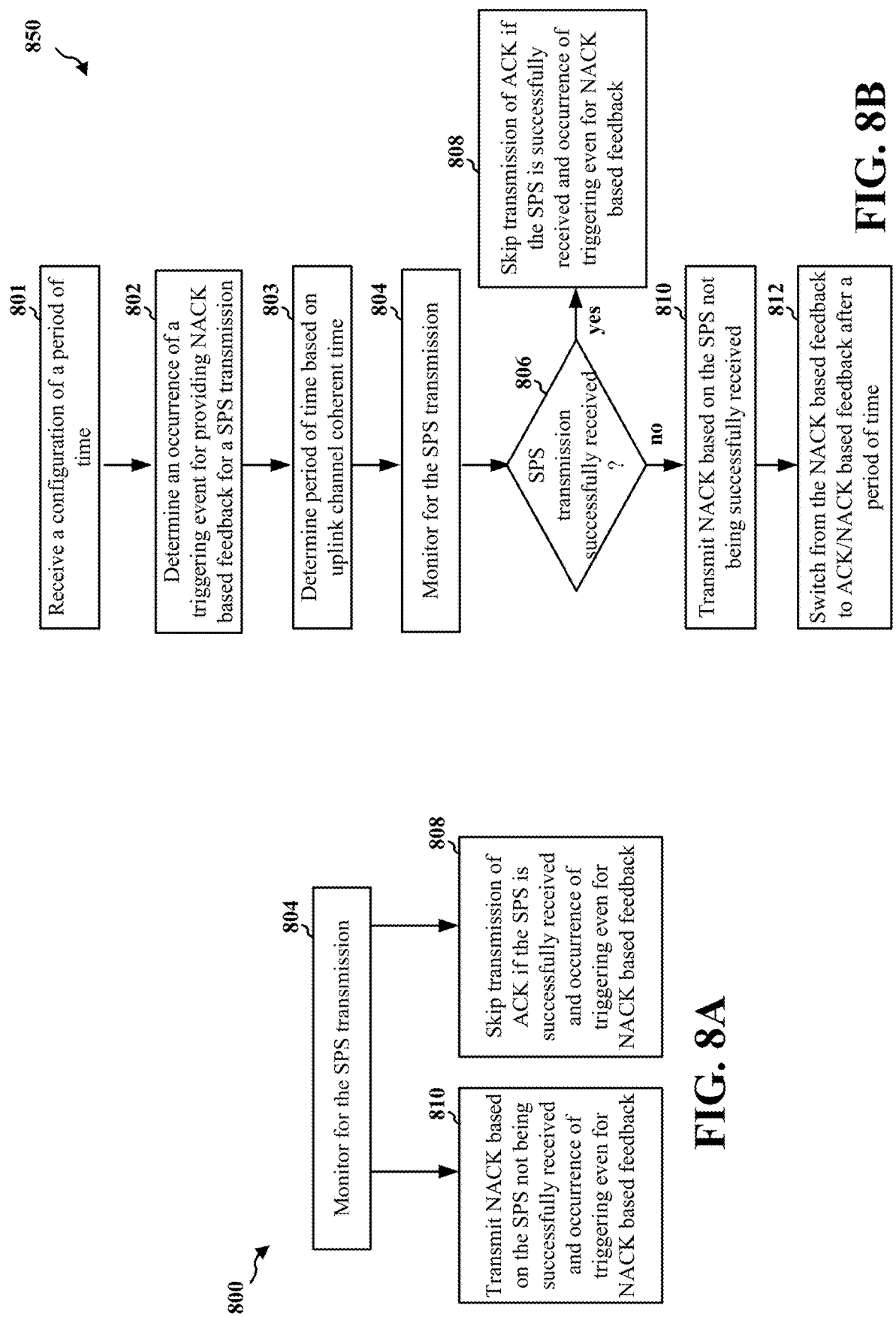
FIGS. 8A and 8B are flowcharts of methods of wireless communication including NACK based feedback, in accordance with aspects of the present disclosure.
Figure 9:
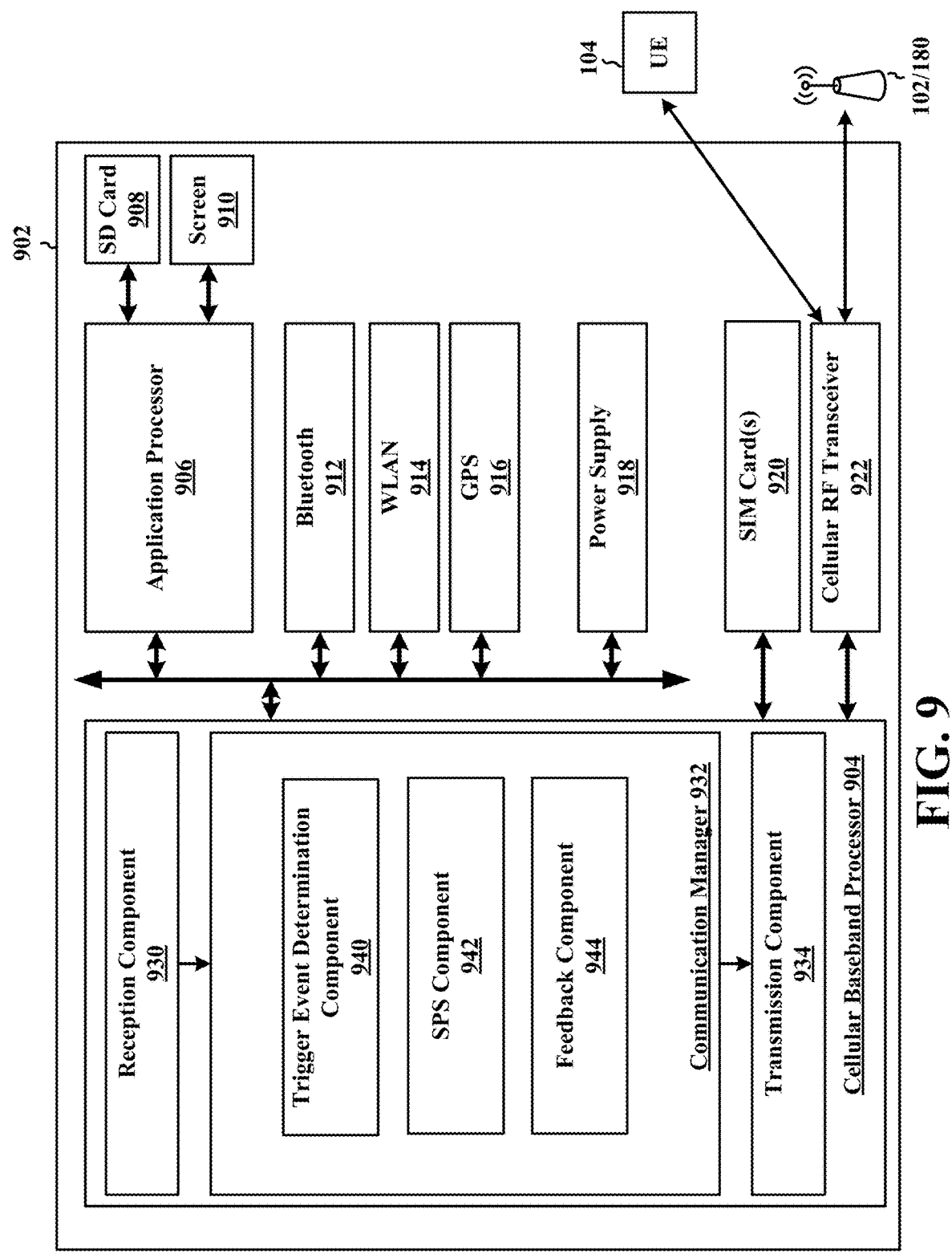
FIG. 9 is a diagram illustrating an example of a hardware implementation for an example apparatus configured to perform wireless communication including NACK based feedback, in accordance with aspects of the present disclosure.

FIG. 8A is a flowchart 800 of a method of wireless communication. The method may be performed by a device that is capable of receiving SPS transmissions. FIG. 9 illustrates an example of an apparatus 902 that may be configured to perform the aspects of FIG. 8A. In some aspects, the method may be performed by a UE, a component of a UE, or a device that implements UE functionality. (e.g., the UE 104, 350, 702; the apparatus 902). The method may enable the UE to use uplink resources more efficiently while providing effective feedback for SPS transmissions.

At 804, the UE monitors for the SPS transmission. The UE may attempt to receive the SPS transmissions during SPS transmission occasions, e.g., as described in connection with any of FIGS. 4-7. The SPS transmission may be SPS PDSCH, for example. The monitoring may be performed, e.g., by the SPS component 942 of the communication manager 932 of the apparatus 902 in FIG. 9.

At 808, the UE transmits a NACK if the SPS transmission is not successfully received and based on the occurrence of a NACK based feedback triggering event. The NACK based feedback may also be referred to as NACK only feedback, e.g., in which the UE provides a NACK for unsuccessful reception and does not provide an ACK if the UE successfully receives the SPS transmission. For example, as illustrated at 806, the UE may determine whether the SPS transmission is successfully received, and may transmit the NACK. The transmission of the NACK may be performed, e.g., by the feedback component 944 of the communication manager 932 of the apparatus 902 in FIG. 9.

The triggering event may be based on the SPS transmission being a retransmission.

FIG. 5 illustrates an example of a triggering event being based on retransmission. The retransmission may be for an SPS PDSCH transmission and may have a same HARQ ID as an initial transmission of the SPS PDSCH. The retransmission may be for an SPS PDSCH transmission and may have a different HARQ ID than an initial transmission of the SPS PDSCH. The retransmission may be for a dynamically scheduled PDSCH transmission.

The triggering event may be based on an uplink channel condition. In some examples, the triggering event may be based on an uplink channel quality meeting a threshold. In some examples, the triggering event may be based on a threshold amount of available power headroom for an uplink channel.

At 810, the UE refrains from sending, e.g., skips transmission of, an ACK if the SPS transmission is successfully received based on the occurrence of the triggering event for providing NACK based feedback. The skipping the transmission of the ACK may be performed, e.g., by the feedback component 944 of the communication manager 932 of the apparatus 902 in FIG. 9.

If the UE does not determine the occurrence of the triggering event, the UE may provide ACK/NACK based feedback. For example, the UE may provide NACK based feedback for retransmissions, and the UE may transmit an ACK if an initial SPS transmission is successfully received, e.g., as described in connection with FIG. 5.

FIG. 8B is a flowchart 850 of a method of wireless communication. The method in FIG. 8B may include any of the aspects of the method described in connection with FIG. 8A, and similar aspects are illustrated with a same reference number as in FIG. 8A. FIG. 9 illustrates an example of an apparatus 902 that may be configured to perform any of the aspects of FIG. 8B.

As an example, at 802, the UE may further determine an occurrence of a triggering event for providing NACK based feedback for a SPS transmission. In some aspects, the transmission of the NACK feedback at 810 or the skipped transmission of the ACK at 808 may be in response to the determination, at 802, of the occurrence of the triggering event. The determination may be performed, e.g., by the trigger event determination component 940 of the communication manager 932 of the apparatus 902 in FIG. 9. FIGS. 5, 6, and 7 illustrate examples of a UE determining an occurrence of a triggering event.

At 812, the UE switches from the NACK based feedback to an ACK and NACK based feedback after a period of time. The switch to the ACK/NACK feedback may be performed, e.g., by the feedback component 944 of the communication manager 932 in FIG. 9. FIG. 12 illustrates an example of the UE turning off the NACK based feedback after a period of time. The period of time may be based on at least one of a first time at which the UE sends a NACK to the base station (e.g., T0) or a second time at which the UE receives an indication of a retransmission from the base station (e.g., T1). As described in connection with FIG. 12, the timer may be based on T0-T1 in some examples. As illustrated at 801, the UE may receive a configuration of the period of time from the base station. For example, the UE may receive the configuration of one or more parameters for the timer in RRC signaling from the base station. For example, the base station may configure T0 for the UE. In other examples, such as shown at 803, the UE may determine the period of time, e.g., based on an uplink channel coherent time estimation.

FIG. 9 is a diagram 900 illustrating an example of a hardware implementation for an apparatus 902. The apparatus 902 may be a UE, a component of a UE, or may implement UE functionality. In some aspects, the apparatus may be a device that is configured to receive SPS transmissions. In some aspects, the apparatus 902 may include a cellular baseband processor 904 (also referred to as a modem) coupled to a cellular RF transceiver 922. The aspects may include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and/or a power supply 918. The cellular baseband processor 904 communicates through the cellular RF transceiver 922 with the UE 104 and/or the base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the cellular baseband processor 904, and in another configuration, the apparatus 902 may be the entire UE (e.g., see 350 of FIG. 3) and include the additional modules of the apparatus 902.

The communication manager 932 includes an SPS component 942 that is configured to monitor for an SPS transmission, e.g., as described in connection with 804 in FIG. 4. The communication manager 932 further includes a feedback component 944 that is configured to transmit a NACK if the SPS transmission is not successfully received and based on the occurrence of a triggering event for providing NACK based feedback for the SPS transmission, The feedback component 944 may be further configured to skip transmitting an ACK if the SPS transmission is successfully received based on the occurrence of the triggering event for providing NACK based feedback, e.g., as described in connection with any combination of 806, 808, or 810 in FIG. 8A or 8B. In some aspects, the communication manager 932 may include a trigger event determination component 940 that is configured to determine an occurrence of a triggering event for providing NACK based feedback for an SPS transmission, e.g., as described in connection with 802 in FIG. 8B.

The apparatus may include additional components that perform each of the blocks of the algorithm in the flowcharts of FIG. 8A or 8B and/or the aspects performed by the UE in the communication flow in FIG. 7. As such, each block in the flowcharts of FIG. 8A or 8B and/or the aspects performed by the UE in the communication flow in FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for determining an occurrence of a triggering event for providing NACK based feedback for an SPS transmission (e.g., the trigger event determination component 940). The apparatus 902 includes means for monitoring for the SPS transmission (e.g., the SPS component 942 and/or the reception component 930). The apparatus includes means for transmitting a NACK if the SPS transmission is not successfully received and for refraining from sending an ACK if the SPS transmission is successfully received based on the occurrence of the triggering event for providing NACK based feedback (e.g., the feedback component 944 of the communication manager 932, the transmission component 934, and/or the cellular RF transceiver). The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
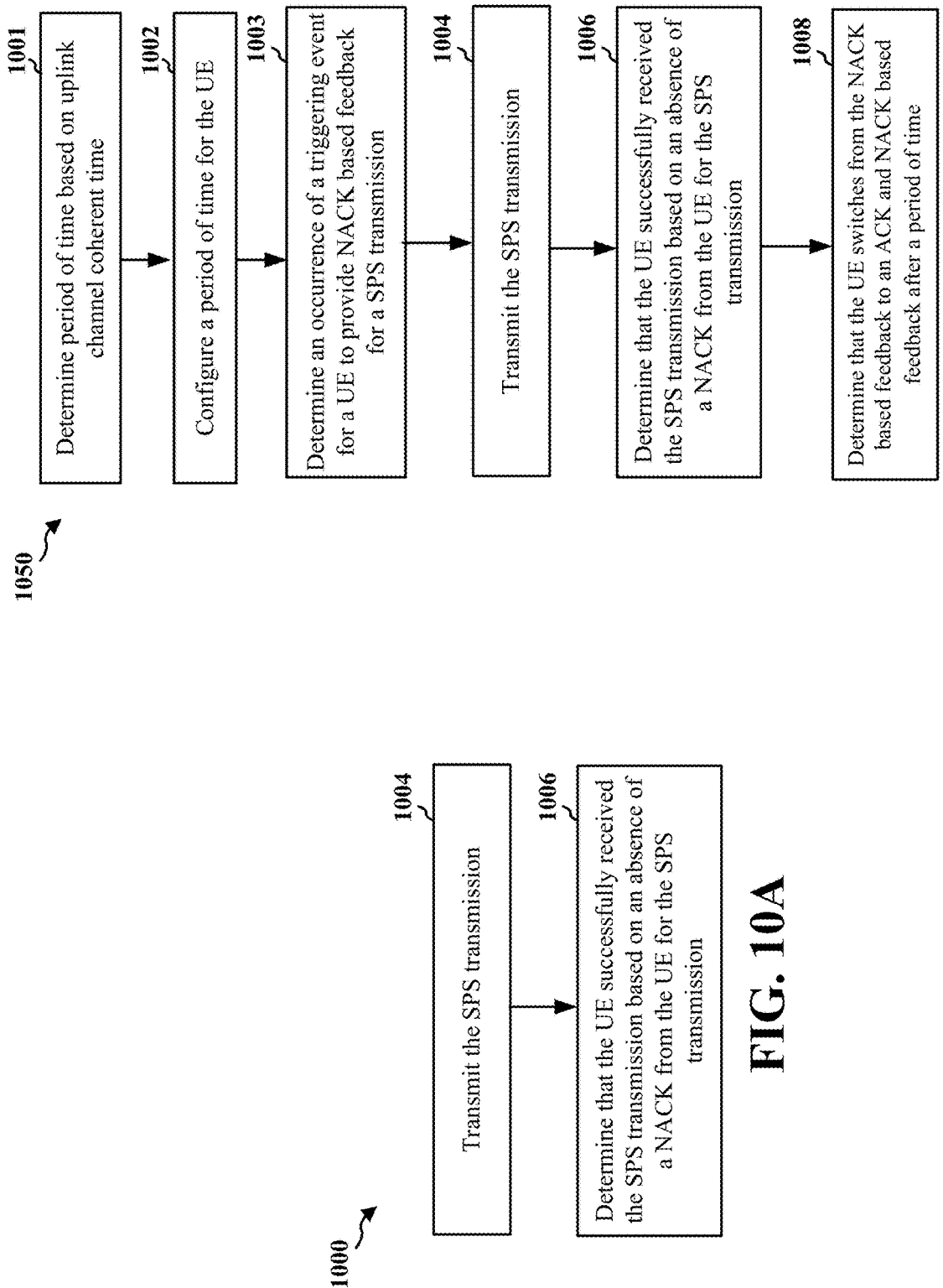
FIGS. 10A and 10B are flowcharts of methods of wireless communication including NACK based feedback, in accordance with aspects of the present disclosure.
Figure 11:
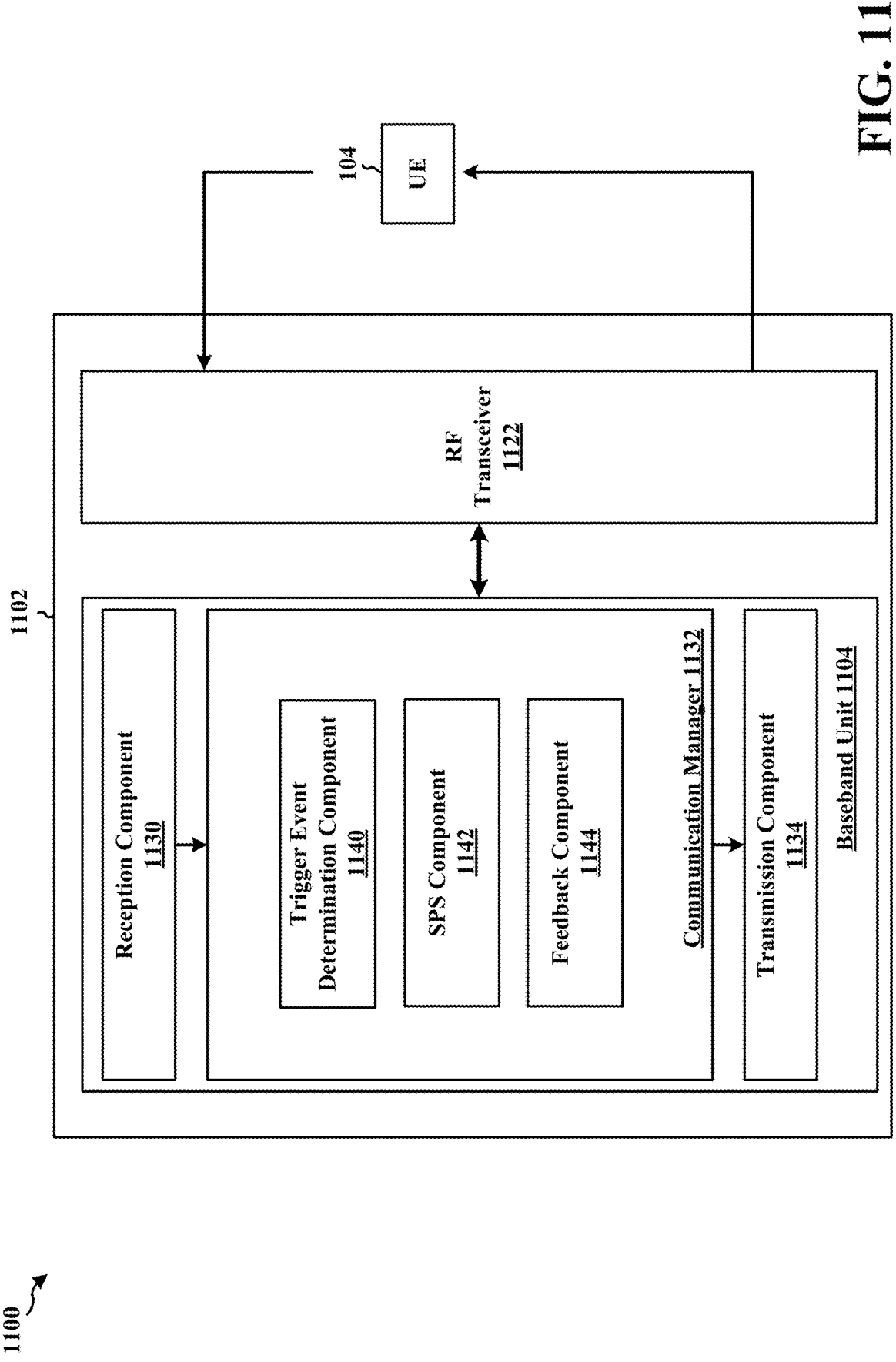
FIG. 11 is a diagram illustrating an example of a hardware implementation for an example apparatus configured to perform wireless communication including monitoring for NACK based feedback, in accordance with aspects of the present disclosure.

FIG. 10A is a flowchart 1000 of a method of wireless communication. The method may be performed by a device that is capable of transmitting SPS transmissions. FIG. 11 illustrates an example of an apparatus 1102 that may be configured to perform the aspects of FIG. 10A. In some aspects, the method may be performed by a base station, a component of a base station, or a device that implements base station functionality (e.g., the base station 102/180, 310, 704; the apparatus 1102). The method may enable a more efficient use of uplink resources while providing effective feedback for SPS transmissions.

At 1004, the base station transmits an SPS transmission. The transmission may be performed by the SPS component 1142 of the apparatus 1102 in FIG. 11. The SPS transmission may be an SPS PDSCH transmission. The base station may transmit the SPS transmission based on an SPS configuration and activation. The base station may transmit the SPS transmission in an SPS transmission occasion, for example.

At 1006, the base station determines that the UE successfully received the SPS transmission based on an absence of a NACK from the UE for the SPS transmission. The determination may be performed by the feedback component 1144 of the apparatus 1102 in FIG. 11. The NACK based feedback may also be referred to as NACK only feedback, e.g., in which the base station receives a NACK for unsuccessful reception and does not receive an ACK if the UE successfully receives the SPS transmission. FIGS. 5, 6, and 7 illustrate example aspects of triggering events.

The triggering event may be based on the SPS transmission being a retransmission.

FIG. 5 illustrates an example of a triggering event being based on retransmission. The retransmission may be for an SPS PDSCH transmission and may have a same HARQ ID as an initial transmission of the SPS PDSCH. The retransmission may be for an SPS PDSCH transmission and may have a different HARQ ID than an initial transmission of the SPS PDSCH. The retransmission may be for a dynamically scheduled PDSCH transmission.

The triggering event may be based on an uplink channel condition. In some examples, the triggering event may be based on an uplink channel quality meeting a threshold. The base station may measure the uplink channel quality based on an SRS received from the UE. In some examples, the triggering event may be based on a threshold amount of available power headroom for an uplink channel. For example, the UE may send power headroom report to base station, e.g., periodically or based on a trigger. The base station may use the power headroom report from the UE to determine that the uplink channel quality, e.g., to determine that the triggering event has occurred.

If the base station does not determine the occurrence of the triggering event, the base station may monitor for ACK/NACK based feedback from the UE. For example, the base station may not determine that the UE successfully receives an initial SPS transmission successfully if the base station does not receive an ACK from the UE, e.g., as described in connection with FIG. 5.

FIG. 10B is a flowchart 1050 of a method of wireless communication. The method in FIG. 10B may include any of the aspects of the method described in connection with FIG. 10A, and similar aspects are illustrated with a same reference number as in FIG. 10A. FIG. 11 illustrates an example of an apparatus 1102 that may be configured to perform any of the aspects of FIG. 10B.

As an example, at 1003, the base station may further determine an occurrence of a triggering event for a UE to provide NACK based feedback for an SPS transmission. The determination may be performed by the trigger event determination component 1140 of the apparatus 1102 in FIG. 11. FIGS. 5, 6, and 7 illustrate examples of a base station determining an occurrence of a triggering event.

At 1008, the base station may determine that the UE switches from the NACK based feedback to an ACK and NACK based feedback after a period of time. The determination of the switch to the ACK/NACK feedback may be performed, e.g., by the feedback component 1144 of the communication manager 1132 in FIG. 11. FIG. 12 illustrates an example of the UE turning off the NACK based feedback after a period of time. The period of time may be based on at least one of a first time at which the UE sends a NACK to the base station (e.g., T0) or a second time at which the UE receives an indication of a retransmission from the base station (e.g., T1). As described in connection with FIG. 12, the timer may be based on T0-T1 in some examples. As illustrated at 1002, the base station may configure the period of time for the UE. For example, the base station may provide the configuration of one or more parameters for the timer in RRC signaling to the UE. For example, the base station may configure T0 for the UE. As illustrated at 1001, the base station may determine the period of time based on an uplink channel coherent time for the UE.

FIG. 11 is a diagram 1100 illustrating an example of a hardware implementation for an apparatus 1102. The apparatus 1102 may be a transmitting device that transmits SPS transmissions. In some aspects, the apparatus 1102 may be a base station, a component of a base station, or may implement base station functionality. The apparatus 1102 includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 may include a trigger event determination component 1140 that determines an occurrence of a triggering event for a UE to provide NACK based feedback for a SPS transmission, e.g., as described in connection with 1003 in FIG. 10B. The communication manager 1132 includes an SPS component 1142 that transmits an SPS transmission, e.g., as described in connection with 1004 in FIG. 10A or 10B. The communication manager 1132 further includes a feedback component 1144 that determines that the UE successfully received the SPS transmission based on an absence of a NACK from the UE for the SPS transmission, e.g., as described in connection with 1006 in FIG. 10A or 10B.

The apparatus may include additional components that perform each of the blocks of the algorithm in the flowcharts of FIG. 10A or 10B and/or the aspects performed by the base station in the communication flow in FIG. 7. As such, each block in the flowcharts of FIG. 10A or 10B and/or the aspects performed by the base station in the communication flow in FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting the SPS transmission (e.g., the SPS component 1142 and/or the transmission component 1134). The apparatus includes means for determining that the UE successfully received the SPS transmission based on an absence of a NACK from the UE for the SPS transmission (e.g., the feedback component 1144 of the communication manager 1132). In some aspects, the apparatus 1102 may further include means for determining an occurrence of a triggering event for a UE to provide NACK based feedback for a SPS transmission (e.g., the trigger event determination component 1140). The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following example aspects are illustrative only and may be combined with aspects or teachings described herein, without limitation.

Aspect 1 is a method of wireless communication at a UE, comprising: determining an occurrence of a triggering event for providing NACK based feedback for a SPS transmission; monitoring for the SPS transmission; transmitting a NACK if the SPS transmission is not successfully received; and refraining from sending an ACK if the SPS transmission is successfully received based on the occurrence of the triggering event for providing NACK based feedback.

Aspect 2 is a method of wireless communication at a UE, comprising: monitoring for the SPS transmission; transmitting a NACK if the SPS transmission is not successfully received and based on an occurrence of a triggering event for providing NACK based feedback for a SPS transmission; and skipping transmission of an ACK if the SPS transmission is successfully received based on the occurrence of the triggering event for providing NACK based feedback.

In aspect 3, the method of aspect 1 or aspect 2 further includes that the triggering event is based on the SPS transmission being a retransmission.

In aspect 4, the method of aspect 3 further includes that the UE transmits the ACK for successful receipt of an initial SPS transmission, wherein the UE skips transmission of the ACK for the retransmission.

In aspect 5, the method of any of aspects 2 or 3 further includes that the retransmission is for an SPS PDSCH transmission and has a same HARQ ID as an initial transmission of the SPS PDSCH.

In aspect 6, the method of any of aspects 2-4 further includes that the retransmission is for an SPS PDSCH transmission and has a different HARQ ID than an initial transmission of the SPS PDSCH transmission.

In aspect 7, the method of any of aspects 2-4 further includes that the retransmission is for a dynamically scheduled PDSCH transmission.

In aspect 8, the method of any of aspects 1-7 further includes that the triggering event is based on an uplink channel condition.

In aspect 9, the method of aspect 8 further includes that the triggering event is based on an uplink channel quality meeting a threshold.

In aspect 10, the method of any of aspects 8 or 9 further includes that the triggering event is based on a threshold amount of available power headroom for an uplink channel.

In aspect 11, the method of any of aspects 1-10 further includes switching from the NACK based feedback to an acknowledgment (ACK) and NACK based feedback after a period of time.

In aspect 12, the method of aspect 10 further includes that the period of time is based on at least one of a first time at which the UE sends a NACK to the base station or a second time at which the UE receives an indication of a retransmission from the base station.

In aspect 13, the method of aspect 10 or 11 further includes receiving a configuration of the period of time from the base station.

In aspect 14, the method of aspect 10 or 11 further includes determining the period of time based on an uplink channel coherent time estimation.

Aspect 15 is a device or apparatus including memory and at least one processors coupled to the memory and configured to cause the device to implement a method as in any of aspects 1-14.

In aspect 16, the apparatus or device of aspect 15 further includes at least one antenna and a transceiver coupled to the at least one antenna and the at least one processor.

Aspect 17 is a system or apparatus including means for implementing a method or realizing an apparatus as in any of aspects 1-14.

In aspect 18, the system or apparatus of aspect 17 further includes at least one antenna and a transceiver coupled to the at least one antenna.

Aspect 19 is a non-transitory computer readable medium storing instructions executable by one or more processors to cause the one or more processors to implement a method as in any of aspects 1-14.

Aspect 20 is a method of wireless communication at a base station, comprising: determining an occurrence of a triggering event for a UE to provide NACK based feedback for an SPS transmission; transmitting the SPS transmission; and determining that the UE successfully received the SPS transmission based on an absence of a NACK from the UE for the SPS transmission.

Aspect 21 is a method of wireless communication at a base station, comprising: transmit a SPS transmission to a UE; and determine that the UE successfully received the SPS transmission based on an absence of a NACK from the UE for the SPS transmission and an occurrence of a triggering event for the UE to provide NACK based feedback for the SPS transmission.

In aspect 22, the method of aspect 20 or aspect 21 further includes that the triggering event is based on the SPS transmission being a retransmission.

In aspect 23, the method of aspect 22 further includes that the base station does not determine that the UE successfully receives an initial SPS transmission successfully if the base station does not receive an ACK from the UE.

In aspect 24, the method of any of aspects 22 or 23 further includes that the retransmission is for an SPS PDSCH transmission and has a same HARQ ID as an initial transmission of the SPS PDSCH.

In aspect 25, the method of any of aspects 22 or 23 further includes that the retransmission is for an SPS PDSCH transmission and has a different HARQ ID than an initial transmission of the SPS PDSCH transmission.

In aspect 26, the method of any of aspects 22 or 23 further includes that the retransmission is for a dynamically scheduled PDSCH transmission.

In aspect 27, the method of any of aspects 20-26 further includes that the triggering event is based on an uplink channel condition.

In aspect 28, the method of aspect 27 further includes that the triggering event is based on an uplink channel quality meeting a threshold.

In aspect 29, the method of aspect 27 or 28 further includes that the triggering event is based on a threshold amount of available power headroom for an uplink channel.

In aspect 30, the method of any of aspects 20-29 further includes switching from monitoring for the NACK based feedback to monitoring for an ACK and NACK based feedback after a period of time.

In aspect 31, the method of aspect 30 further includes that the period of time is based on at least one of a first time at which the base station receives a NACK from the UE or a second time at which the base station transmits an indication of a retransmission from the base station.

In aspect 32, the method of any of aspects 30 or 31 further includes configuring the period of time for the UE.

In aspect 33, the method of any of aspects 30 or 31 further includes that the period of time is based on an uplink channel coherent time estimation.

Aspect 34 is a device including memory and at least one processor coupled to the memory and configured to cause the device to implement a method as in any of aspects 20-33.

In aspect 35, the apparatus or device of aspect 34 further includes at least one antenna and a transceiver coupled to the at least one antenna and the at least one processor.

Aspect 36 is a system or apparatus including means for implementing a method or realizing an apparatus as in any of aspects 20-33.

In aspect 37, the apparatus or device of aspect 36 further includes at least one antenna and a transceiver coupled to the at least one antenna.

Aspect 38 is a non-transitory computer readable medium storing instructions executable by one or more processors to cause the one or more processors to implement a method as in any of aspects 20-33.

What is claimed is:

1. An apparatus for wireless communication at a user equipment (UE), comprising:
   memory; and
   at least one processor coupled to the memory and configured to:
   monitor for semi-persistent scheduling (SPS) transmissions;
   transmit an acknowledgment and negative acknowledgement (ACK/NACK) based feedback for a first SPS transmission, the ACK/NACK feedback including a first negative acknowledgment (NACK) if the first SPS transmission is not successfully received and a first acknowledgement (ACK) if the first SPS transmission is received; and
   change from the ACK/NACK feedback to NACK based feedback based on an occurrence of a triggering event for providing the NACK based feedback for a second SPS transmission, wherein the NACK based feedback includes transmission of a second NACK if the second SPS transmission is not successfully received and a skipped transmission of a second ACK if the second SPS transmission is successfully received.

2. The apparatus of claim 1, wherein the triggering event is based on the second SPS transmission being a retransmission.

3. The apparatus of claim 2, wherein the at least one processor is further configured to transmit the first ACK for successful receipt of an initial SPS transmission and to skip the second ACK in response to the second SPS transmission being the retransmission.

4. The apparatus of claim 2, wherein the retransmission is for an SPS physical downlink shared channel (PDSCH) transmission and has a same hybrid automatic repeat request (HARQ) identifier (ID) as an initial transmission of the SPS PDSCH transmission.

5. The apparatus of claim 2, wherein the retransmission is for an SPS physical downlink shared channel (PDSCH) transmission and has a different hybrid automatic repeat request (HARQ) identifier (ID) than an initial transmission of the SPS PDSCH transmission.

6. The apparatus of claim 2, wherein the retransmission is for a dynamically scheduled physical downlink shared channel (PDSCH) transmission.

7. The apparatus of claim 1, wherein the triggering event is based on an uplink channel condition.

8. The apparatus of claim 7, wherein the triggering event is based on an uplink channel quality meeting a threshold.

9. The apparatus of claim 7, wherein the triggering event is based on a threshold amount of available power headroom for an uplink channel.

10. The apparatus of claim 1, wherein the at least one processor is further configured to:
    switch from the NACK based feedback to the ACK/NACK based feedback after a period of time.

11. The apparatus of claim 10, wherein the period of time is based on at least one of a first time at which the UE sends the NACK to a base station and a second time at which the UE receives an indication of a retransmission from the base station.

12. The apparatus of claim 11, wherein the at least one processor is further configured to:
    receive a configuration of the period of time from the base station.

13. The apparatus of claim 11, wherein the period of time is based on an uplink channel coherent time estimation.

14. The apparatus of claim 1, further comprising:
    at least one antenna; and
    at least one transceiver coupled to the at least one antenna and the at least one processor.

15. A method of wireless communication at a user equipment (UE), comprising:
    monitoring for semi-persistent scheduling (SPS) transmissions;
    transmitting an acknowledgment and negative acknowledgement (ACK/NACK) based feedback for a first SPS transmission, the ACK/NACK feedback including a first negative acknowledgement (NACK) if the first SPS transmission is not successfully received and a first acknowledgement (ACK) if the first SPS transmission is received; and changing from the ACK/NACK feedback to NACK based feedback based on an occurrence of a triggering event for providing the NACK based feedback for a second SPS transmission, wherein the NACK based feedback includes transmission of a second NACK if the second SPS transmission is not successfully received and a skipped transmission of a second ACK if the second SPS transmission is successfully received.

* * * * *